UNITED STATES PATENT OFFICE.

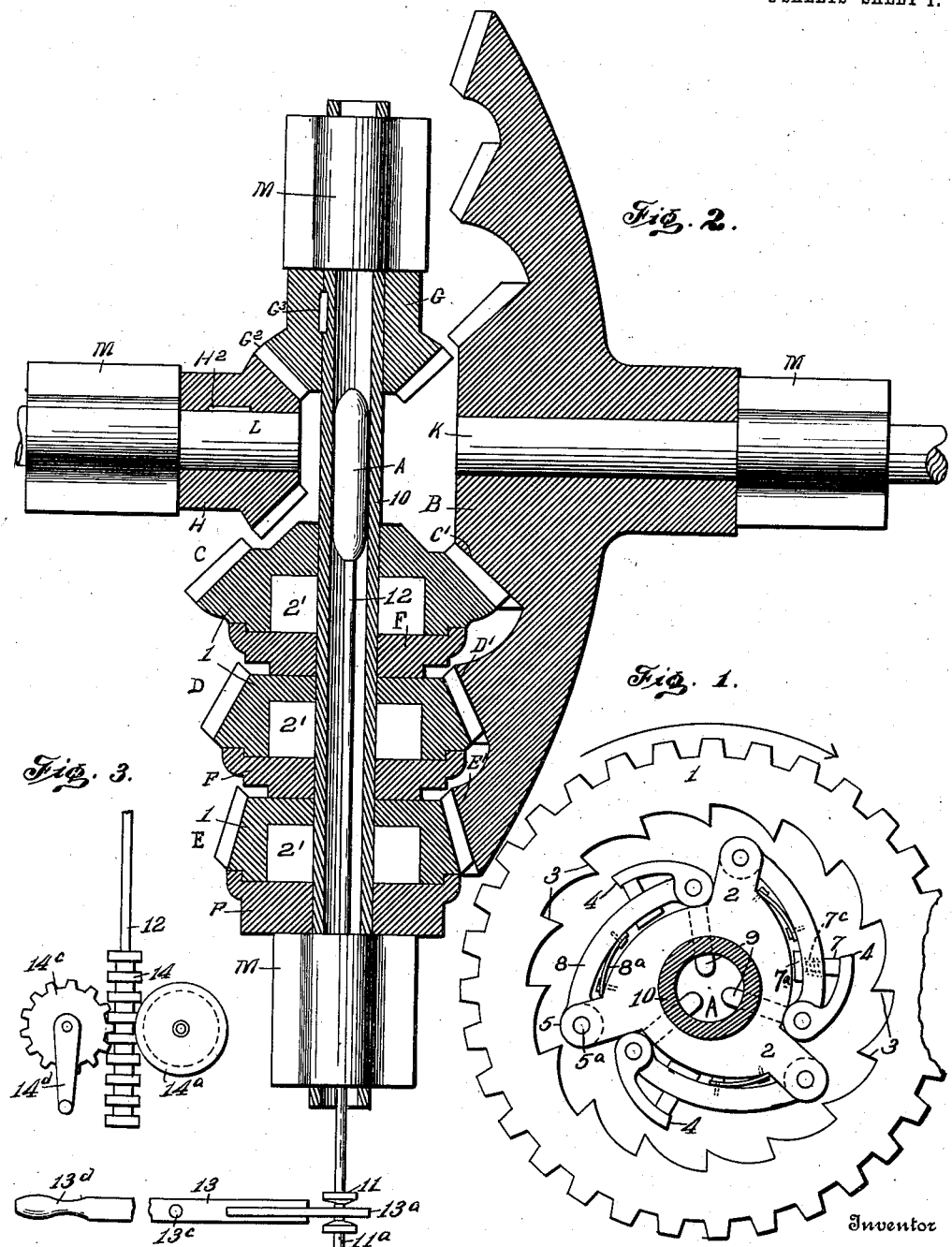

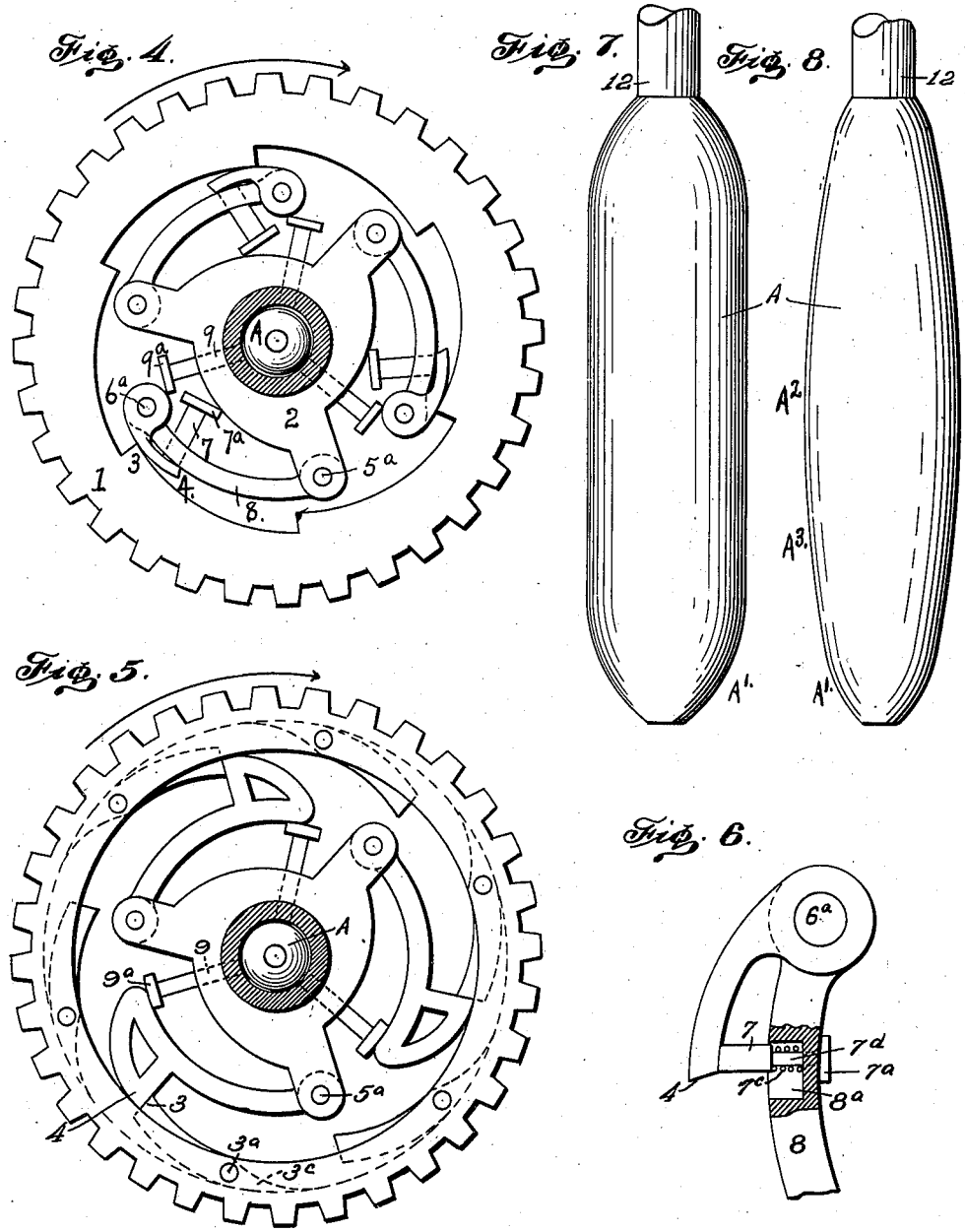

ROLLIN C. OGBURN, OF FLORA, ILLINOIS.

SPEED-CHANGING DEVICE.

No. 857,300.     Specification of Letters Patent.     Patented June 18, 1907.

Application filed July 25, 1904. Serial No. 218,110.

*To all whom it may concern:*

Be it known that I, ROLLIN C. OGBURN, a citizen of the United States, residing at Flora, in the county of Clay, State of Illinois, have invented new and useful Improvements in Speed-Changing Devices, of which the following is a specification.

My invention relates to that class of speed changing mechanisms in which motion from a shaft having a constant speed is to be transmitted to a second shaft at a variety of speeds at the will of the operator and the objects of my invention are, first, to provide a change speed device whereby a positive, permanent and unbroken connection is obtained between the driving and driven shafts; second, to provide a change speed gear whereby different speeds of the driven shaft may be obtained without severing connection with the driving or constant shaft; third, to provide a change speed gear in which a driving shaft running at a constant speed drives a driven shaft running at different speeds whereby the speed of the driven shaft may be changed without stopping the mechanism; and, fourth, to provide a change speed gear in which the transmitting wheels may be gear wheels remaining constantly in mesh while the speed of the driven shaft is being changed without severing connection with the driving shaft.

It may be said in general that my device comprises a plurality of pairs of intermeshing gears: a hollow shaft passing through one set of these gear wheels: a preferably solid shaft passing through the other set of gears: and, a plunger adapted to move through the hollow shaft for causing different wheels of one set to drive the corresponding wheels of the other set.

I attain these objects by the mechanism illustrated in the accompanying drawings, which form a part of this specification and in which Figure 1 is a side view of one of the gears C, D or E (Fig. 2) showing the clutch mechanism whereby the said gear may be engaged to the hollow shaft. Fig. 2 is a sectional view of the system of bevel gear wheels in which the shafts are perpendicular to each other, showing the relative position of the gears, the shafts and the clutches. Fig. 3 is a view showing a controlling device which may be used in cases where the lever device shown in Fig. 2 would be impractical. Fig. 4 is a side view of one of the gears, similar to Fig. 1, with the clutches expanded. Fig. 5 is a view similar to Fig. 4, showing an alternative system of ratchets. Fig. 6 is a detail view showing the construction of the pawl carried at the end of the driving arm 8 (Fig. 1). Fig. 7 is a detail view of the plunger. Fig. 8 is a view of an alternative plunger.

Various arrangements of intermeshing gear wheels or pulleys of different sizes may be employed, in order that power may be transmitted from one shaft to the other, without departing from the spirit of the invention.

The wheels mounted revolubly on the hollow shaft adapted to be engaged to said shaft are herein termed, clutch-wheels. The hollow shaft or tube whereon are mounted the clutch-wheels may be used either as the driving shaft or the driven shaft. Power may be transmitted to and from the said shafts by any suitable means, such as pulleys, gears or sprocket wheels or it may be transmitted to and from any of the wheels on said shafts by gears meshing with them or by pulleys, sprockets or gears attached to them. The change speed gears may be built into or compound with other machines such as lathes, planers, shapers, drills, milling machines, etc.

Each clutch-wheel (Fig. 1) consists of two parts, 1 and 2. The part 1 may have teeth on its periphery and has an opening in its side (2', Fig. 2) with internal ratchet teeth 3 3 3. Plates F, (Fig. 2) may be attached to the parts, 1, (Fig. 2) for the purpose of inclosing the clutch mechanisms and strengthening the said clutch-wheels. Part 2 is rigidly fixed to the hollow shaft 10, and rotates therewith and is adapted to drive or be driven by part 1 by means of clutches as hereafter described. Posts 5, form a part of the cam wheel signified as part 2. Pivoted at 5$^a$ to the said posts are bars 8, which carry pivoted to their free ends 6, pawls 4, the points of which are adapted to fit into and engage the ratchet teeth, 3. Attached to the free ends of said pawls 4, are pins or posts 7, projecting through perforations in said bars 8, and having at their free ends heads indicated by 7$^a$ Fig. 4. A cavity 8$^a$, is placed in the outer side of each arm 8, into which the post 7, is adapted to sink. A spring 7$^c$ surrounding the inner and smaller part of the post 7$^d$, is adapted to hold the pawl 4, out into an erect position and to allow it to be depressed by power pressing upon it from its inclined side. Thus the pawl 4, may be depressed by, and slide freely over the ratchet teeth, as shown in Fig. 4, when the outside part 1, is traveling backward with respect to the arrow and the inside part 2, but the two parts become attached together when the motion is forward. The ratchet teeth 3, may be pivoted to the outer portion 1, of said clutch-wheels so that they may be depressed to allow solid pawls, Fig. 5, to pass over them. The pins 9, may be pivoted at 6ª, to the free end of the bars 8 but separate pins 9 with heads 9ª (Fig. 4) are preferred. Any suitable form of springs 8ᵈ, (Fig. 1) may be used, in order to overcome the centrifugal force and the weight of the expanding ratchets 8.

With the hollow shaft 10, revolving and with the plunger A, absent the expanding clutches lie near the inner portion 2 of the clutch-wheel and the outer portion 1, is at rest independent of the hollow shaft. When the plunger is moved into the clutch-wheel it forces the pins 9, outward and they lift the free ends of the bars 8, carrying the pawls 4, out into positive engagement with the ratchet teeth 3. It will be especially apparent however that the pawls 4, do not expand directly out from the center but expand in nearly as much of a forward direction as an outward direction. Thus the arrangement of this device is such that while the pins 9, may be forced away from the center, they in turn force the pawls out, but the pawls being pivoted upon bars pivoted at 5ª, cannot expand directly outward but pass forward and outward at once. It will also be obvious that when said pawls retract they will return in a backward and inward direction. Should the pawls 4, expand directly outward into the teeth 3, and pressure be applied, the said pawls would stick or bind within said teeth and could not be removed easily. With this forward expansion device the force which would bind with the outward expanding clutch, will of itself, automatically release the pawl from the teeth and force it inward. A spring is necessary only to sustain the weight of the bars 8 and overcome their centrifugal force. While the plunger A, is centered in the clutch-wheel the outer portion is positively engaged to the inner part and must revolve with the shaft. Thus the whole wheel becomes fixed to the shaft as a one-piece wheel. When the plunger is removed the pawls 4, are forced to retract and return to their inner position and they in turn force the pins 9, into the shaft as shown in Fig. 1.

It will be apparent (Fig. 2) that the plunger A, is sufficiently long to engage two of the clutch-wheels at once. While the plunger A is in the position shown in Fig. 2 it does not engage any of the clutch-wheels, consequently the wheel B, would rotate but would transmit no power to the hollow shaft 10. The plunger is operated and controlled by a bar 12, having at its free ends, collars 11 and 11ª, between which the bifurcated part, 13ª, of the lever 13 rides. The lever 13, is pivoted at 13ᶜ, to a suitable support. Another method of operating the said plunger is shown in Fig. 3. A circular rack is attached to its free end in which the teeth of a gear wheel 14ᶜ, mesh.

When the plunger A, is drawn into the clutch-wheel C, the clutches on the inner part 2, expand and engage the teeth on the outer part 1. Thus the wheel B, driving the wheel C, also drives the hollow shaft 10.

When the plunger is drawn slightly into wheel D, the parts 1 and 2 of the wheel D, become attached together before the parts 1 and 2 of the wheel C, are disengaged. Thus the wheels C and D, are both engaged to the hollow shaft 10, which would seem to produce an interference and stop or wreck the whole mechanism, but it will be noted that when the wheel D, becomes engaged to the hollow shaft 10, the wheel C also being engaged to said shaft, the wheel B, will drive wheel D, faster than wheel C, and the wheel D, will cause the hollow shaft 10, to rotate faster than the wheel C, consequently the inner part 2, of the wheel C, will travel in the direction of the arrow (Fig. 1) faster than the outer part 1, which will force the pawls 4, (Fig. 4) to become depressed and to slide over the teeth 3. Thus the clutch-wheel which revolves at the highest speed is actively engaged to the hollow shaft and the wheel of lower speed is inactively engaged to said shaft. However if the higher speed wheel should cease to be engaged, as in case the plunger should be forced backward, then the lower speed wheel instantly becomes positively engaged. When the plunger (Fig. 2) passes on, centering itself in the wheel D the clutches of the wheel C, retract and become disengaged from the teeth of the outside part.

The manner of increasing the speed from the wheel D, to the wheel E, is similar to the manner of increasing the speed from the wheel C, to the wheel D, as described. The manner of decreasing the speed is the reverse of that of the increase of speed. As shown in Fig. 2, the bevel gear B, is the power wheel and drives the bevel pinions C, D and E. The hollow shaft is driven by one or the other of the wheels C, D or E and it in turn drives the miter gear G, which is keyed fast to it. The miter gear G, drives the gear H, which drives the shaft L, being keyed thereto. Thus the power is transmitted at different speeds in the line of shaft and in the original direction. The different speeds are attained simply by forcing the plunger A, into one or the other of the clutch-wheels C, D or E. The speed changing mechanism may be inclosed in a case and run in oil. Any number of the internal ratchet teeth may be used according to the requirements of the device.

The preferred form of plunger is shown in Fig. 7, however the plunger may be made to taper slightly toward its ends as shown in Fig. 8. Solid pawls may be used as shown in Fig. 5, but the mechanism shown in Fig. 1, is preferred.

The construction and mode of operation of the different parts may be considerably varied. For example, I prefer to have the plunger A, rotate with the shaft 10, and it is with this in mind that I have used the collars 11 and 11ª, so that the bar 12, may be free to rotate about its longitudinal axis without affecting the lever 13, and this feature has also been in mind when the circular rack 14 (Fig. 3) and wheels 14ª and 14ᶜ are designed. Means for holding the plunger in connection with the hollow shaft so that it will slide longitudinally in said shaft but will not rotate independent of said shaft may be employed. It is possible also that belted pulleys may be substituted instead of gear wheels.

For the use of automobiles and for use in various kinds of machines, additional wheels may be used adapted to slide or recede out of mesh, provided that the forward expanding clutch, the hollow shaft and the sliding plunger are employed as herein specified.

What I claim as new and desire to be secured by Letters Patent is:

1. In a clutch for speed changing gears, a hollow shaft, a wheel having internal ratchet teeth mounted revolubly thereon and a clutch carrying wheel attached fixedly thereto, curved bars pivoted to said clutch carrying wheel, pawls pivoted to the free ends of said bars, pins passing radially through said clutch carrying wheel and said shaft, upon which the free ends of said bars rest, and a plunger adapted in passing through said shaft to cause the engagement of said clutch to first named wheel.

2. In a clutch for speed changing gears, a hollow shaft, a wheel having internal ratchet teeth mounted revolubly thereon, a clutch carrying wheel attached fixedly thereto, curved bars pivoted to said clutch carrying wheel, pawls pivoted to the free ends of said bars, pins forming stops attached to said pawls and passing through said curved bars, pins passing radially through perforations in said clutch carrying wheel and said hollow shaft, and a plunger adapted in sliding through said shaft to cause the operation of said clutch, as specified.

3. In a clutch for speed changing gears, a hollow shaft, a wheel, 1, having internal ratchet teeth, 3, mounted revolubly thereon, a clutch carrying wheel, 2, attached fixedly thereto, a plurality of curved bars, 8, pivoted to said clutch carrying wheel, springs, 8ª, adapted to draw the free ends of said curved bars inward, pawls, 6, pivoted to the free ends of said curved bars, pins, 7, attached to said pawls and passing through said curved bars, having heads, 7ª, adapted to form stops, springs, 7ᶜ, adapted to press the pawls, 6, outward, pins, 9, passing radially through perforations in said clutch carrying wheel and said shaft, upon which the said pawls rest, and a plunger adapted in passing through said shaft to force said pins, 9, and said pawls outward, substantially as shown and described and for the purposes set forth.

4. In a clutch for speed changing gears, a hollow shaft, a wheel having internal ratchet teeth mounted revolubly thereon, a clutch carrying wheel attached fixedly thereto, curved bars pivoted to said clutch carrying wheel, pawls pivoted to the free ends of said curved bars, pins passing radially through said clutch carrying wheel and said shaft, upon which said pawls rest, and a plunger adapted in passing through said shaft to force said pins outward and thereby to cause said pawls pivoted to said bars to move outwardly and forwardly toward the ratchet teeth of the said first named wheel, as described.

5. In a clutch for speed changing gears, a hollow shaft, a wheel having internal ratchet teeth revolubly mounted thereon, a clutch carrying wheel fixedly attached thereto, a plurality of curved bars pivoted to said clutch carrying wheel, pawls pivoted to the free ends of said curved bars, pins passing radially through perforations in said clutch carrying wheel and said shaft, and a plunger adapted in passing through said shaft to force said pins outward and thereby to cause said pawls pivoted to said curved bars to move both outward and forward into connection with said ratchet teeth of said first named wheel, the said pawls adapted when in said position to move inwardly with respect to said curved bars in order to allow said ratchet teeth to pass over said pawls, substantially as shown and described and for the purposes set forth.

6. In a clutch for speed changing gears, a hollow shaft, a wheel having internal ratchet teeth mounted revolubly thereon, a clutch carrying wheel attached fixedly thereto, a plurality of curved bars pivoted to said clutch carrying wheel, pawls pivoted to the free ends of said bars, pins passing radially through perforations in said clutch carrying wheel and said shaft, upon which the said pawls rest, and a plunger adapted to pass through said shaft, said clutch being adapted to cause the engagement of said first named wheel to said shaft in one direction only, as described.

7. In a clutch for speed changing gears, a hollow shaft, a wheel having internal ratchet teeth mounted revolubly thereon, a clutch carrying wheel attached fixedly thereto, a plurality of curved bars pivoted to said clutch carrying wheel, pawls pivoted to the free ends of said bars, pins passing radially through perforations in said clutch carrying wheel and said shaft, upon which the said pawls rest, and a plunger adapted to pass through said shaft and to force said pins outward and thereby to cause said pawls pivoted to said curved bars to move both outward and forward into engagement with the ratchet teeth of said first named wheel, the said pawls adapted to become engaged to said ratchet teeth when traveling in one direction only, as described.

ROLLIN C. OGBURN.

Witnesses:
FLORENCE A. ROMICK,
BERNE B. OGBURN.